(12) United States Patent
Broker et al.

(10) Patent No.: US 9,178,447 B2
(45) Date of Patent: Nov. 3, 2015

(54) CONTROL CIRCUITS FOR MOTORS AND RELATED METHODS

(71) Applicant: Emerson Electric Co., St. Louis, MO (US)

(72) Inventors: John F. Broker, Warrenton, MO (US); Roger R. Maus, Waterloo, IL (US)

(73) Assignee: Emerson Electric Co., St. Louis, MO (US)

( * ) Notice: Subject to any disclaimer, the term of this patent is extended or adjusted under 35 U.S.C. 154(b) by 203 days.

(21) Appl. No.: 14/087,597

(22) Filed: Nov. 22, 2013

(65) Prior Publication Data

US 2015/0145457 A1    May 28, 2015

(51) Int. Cl.
*H02P 6/00* (2006.01)
*H02P 1/18* (2006.01)

(52) U.S. Cl.
CPC ........................................ *H02P 1/18* (2013.01)

(58) Field of Classification Search
USPC ......... 318/400.08, 400.09, 66, 772, 821, 825, 318/776; 454/256, 338; 417/44.1; 165/244, 165/265; 62/186, 180; 236/49.1, 49.3, 91 R, 236/91 D, 91 G, 94
See application file for complete search history.

(56) References Cited

U.S. PATENT DOCUMENTS

| | | | |
|---|---|---|---|
| 5,041,775 A | 8/1991 | Erdman | |
| 5,592,058 A | 1/1997 | Archer et al. | |
| 6,307,338 B1 | 10/2001 | Kuner et al. | |
| 6,369,536 B2 | 4/2002 | Beifus et al. | |
| 7,075,255 B1 * | 7/2006 | Gambiana et al. | 318/66 |
| 7,795,827 B2 | 9/2010 | Jeung | |
| 7,843,157 B2 | 11/2010 | Archer et al. | |
| 8,067,912 B2 | 11/2011 | Mullin | |
| 8,078,326 B2 | 12/2011 | Harrod et al. | |
| 2007/0085498 A1 | 4/2007 | Kulkarni et al. | |
| 2011/0181216 A1 | 7/2011 | Bass et al. | |
| 2012/0112728 A1 * | 5/2012 | Bodo et al. | 323/311 |
| 2013/0225060 A1 * | 8/2013 | Heberer et al. | 454/256 |

OTHER PUBLICATIONS http://www.achrnews.com/articles/comparing-motor-technologies-1; Nov. 23, 2009; 16 pgs.
The ECM Textbook, © 2007 GE ECM by Regal-Beloit; 21 pgs.
"QwikSEER+ Theory of Operation and Retrofit Potential", Mainstream Engineering Corporation, Robert P. Scaringe and R. Paul Roth, Jan. 2013; 7 pgs.

* cited by examiner

*Primary Examiner* — Shawki S Ismail
*Assistant Examiner* — Jorge L Carrasquillo
(74) *Attorney, Agent, or Firm* — Harness, Dickey & Pierce, P.L.C.

(57) ABSTRACT

Control circuits and related methods are provided. One exemplary control circuit includes a solid state switching device for coupling to a first tap of a motor and a control device coupled to the solid state switching device. The control device is configured to switch the solid state switching device to apply a signal to the first tap in response to a demand for operation of the motor at a second parameter to operate the motor at the second parameter. The control device is also configured to switch the solid state switching device to apply a signal to the first tap in response to a demand for operation of the motor at a first parameter to operate the motor at the first parameter.

19 Claims, 6 Drawing Sheets

CONTROL CIRCUITS FOR MOTORS AND RELATED METHODS

FIELD

The present disclosure relates to motor control systems and communicating methods for motors.

BACKGROUND

This section provides background information related to the present disclosure which is not necessarily prior art.

Heating, ventilating and air-conditioning (HVAC) systems can be used to regulate the environment within an enclosed space. Typically, an air blower is used to pull air from the enclosed space into the HVAC system and then push the air back into the enclosed space after conditioning the air (e.g., heating, cooling or dehumidifying the air). Various types of HVAC systems may be used to provide conditioned air for enclosed spaces. In the HVAC industry today, electronically commutated motors (ECMs) are known to be controlled by multiple taps. One common motor is known as the X13® motor, manufactured by Regal-Beloit Corporation of Fort Wayne, Ind. This motor has multiple taps, which are controllable by providing 24-volt alternating current (24 VAC) input to one of the taps.

SUMMARY

This section provides a general summary of the disclosure, and is not a comprehensive disclosure of its full scope or all of its features.

According to one aspect of the present disclosure, a control circuit for a motor of a HVAC system is disclosed, the motor including at least a first tap and a second tap, the motor configured to operate at a first parameter when the first tap is energized and at a second different parameter when the second tap is energized. The control circuit includes a solid state switching device for coupling to the first tap of the motor and a control device coupled to the solid state switching device. The control device is configured to switch the solid state switching device to apply a signal to the first tap, in response to a demand for operation of the motor at the second parameter, to operate the motor at the second parameter. The control device is also configured to switch the solid state switching device to apply a signal to the first tap, in response to a demand for operation of the motor at the first parameter, to operate the motor at the first parameter.

According to another aspect of the present disclosure, a method is disclosed for controlling a motor including at least a first tap and a second tap, the motor configured to operate at a first parameter when the first tap is energized and at a second different parameter when the second tap is energized. The method includes applying, by a solid state switching device, a first control signal to the first tap to operate the motor according to the first parameter, when a demand indicates operation of the motor at the first parameter. The method also includes applying, by the solid state switching device, a second control signal to the first tap to operate the motor according to the second parameter, when the demand indicates operation of the motor at the second parameter.

According to yet another aspect of the present disclosure, a motor control assembly includes a motor and a control circuit coupled to the motor. The motor includes a motor controller and a first input circuit coupled to the motor controller. The first input circuit includes a first tap, a second tap, a first opto-isolator, and a first diode. The first opto-isolator is coupled to the motor controller, the first tap, and the second tap. The first diode is coupled in series between the first tap and the first opto-isolator. The input circuit is configured to apply a first control signal to the motor controller in response to an AC signal at the first tap to operate the motor at a first parameter. The first input circuit is configured to apply a second control signal to the motor controller, in response to an AC signal at the second tap to operate the motor at a second parameter. The first control signal defines a first signal pattern, and the second control signal defines a second signal pattern. The control circuit is configured to apply a first direct current (DC) control signal to the first tap. The first DC control signal is substantially consistent with the first signal pattern, when a demand indicates a request for operation of the motor according to the first parameter, and the first DC control signal is substantially consistent with the second signal pattern, when the demand indicates a request for operation of the motor according to the second parameter.

According to another aspect of the present disclosure, a control circuit for a motor of a HVAC system is disclosed, the motor including at least a first tap and a second tap, the motor configured to operate at a first parameter when the first tap is energized with an AC signal and at a second different parameter when the second tap is energized with an AC signal. The control circuit includes a first solid state switching device, a second solid state switching device, and a control device coupled to the first solid state switching device and the second solid state switching device. The control device is configured to switch the first solid state switching device to apply a DC signal to at least one of the first and second tap, in response to a demand for operation of the motor at the first parameter, to operate the motor at the first parameter. The control device is also configured to switch the second solid state switching device to apply a DC signal to at least one of the first and second tap, in response to a demand for operation of the motor at the second parameter, to operate the motor at the second parameter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific devices, circuits, systems, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

Figure 1:
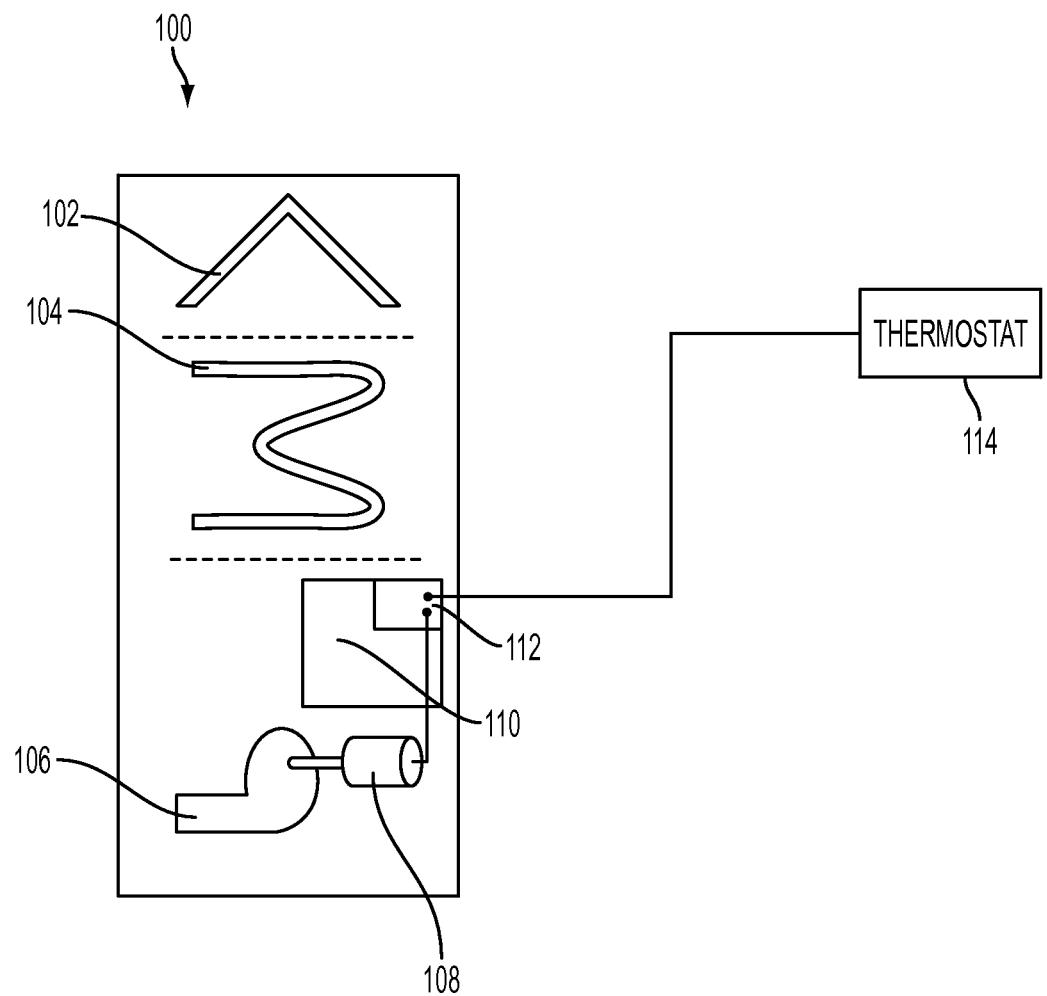
FIG. 1 is an illustration of an example HVAC system.

FIG. 1 illustrates an example heating, ventilation, and air-conditioning (HVAC) system 100. As used herein, HVAC refers generally to any system providing climate control and may include an all cool system, an all heat system, a fan only system, or any combination of heating, cooling, and fan operation. The exemplary HVAC system 100 includes an evaporator coil 102 to cool air passing through the system 100, a heat exchanger 104 to heat air passing through the system 100, and a blower 106 to move air through a particular space. The space may include, for example, a residence, a commercial building, or any other space in which one or more environmental conditions is to be controlled. The blower 106 is coupled to and driven by a motor 108. The HVAC system 100 further includes an indoor control board 110, which is or includes, for example, an integrated furnace control and/or an air handler control. The indoor control board 110 generally controls the HVAC system 100, including the evaporator coil 102, the heat exchanger 104, and the blower 106.

A thermostat 114 is coupled to the indoor control board 110. The thermostat 114 provides a user interface to control certain aspects of the HVAC system 100, such as, for example, temperature of the particular space. Demands and/or calls are provided from the thermostat 114 and/or the indoor control board 110 to cause the HVAC system 100 to operate in different modes and/or according to different routines.

The motor 108 is configured to be capable of operating at different speeds given a particular HVAC setting. Specifically, the motor 108 includes multiple input taps, corresponding to different operating parameters, such as speed and/or torque. For example, energizing one tap by an alternating current (AC) signal causes the motor 108 to operate at one speed, and energizing another tap by an AC signal causes the motor 108 to operate at a different speed. The number of taps of the motor 108 may vary depending on, for example, the particular HVAC system or the installation environment of the HVAC system. In one exemplary embodiment, the motor 108 is the X13® motor manufactured by Regal-Beloit Corporation of Fort Wayne, Ind. Generally, it should be understood that motor 108 may be any suitable motor for controlling an air circulating device of a HVAC system.

The HVAC system 100 includes a control circuit 112. In this particular embodiment, the control circuit 112 is integrated in the indoor control board 110. In other embodiments, a control circuit may be included, alone or in combination with one or more other circuits, elsewhere in the HVAC system 100.

While the motor 108 is configured to receive AC control signals, one per tap to operate the motor 108 according to a parameter corresponding to which tap is energized, the control circuit 112 is configured to apply DC control signals to only one tap of the motor 108 to cause the motor 108 to operate according to different parameters. More specifically, the control circuit 112 is configured to apply a first DC control signal to the motor 108 to operate the motor 108 according to a first parameter and to apply a second DC control signal to the motor 108 to operate the motor 108 according to a second parameter. In this manner, the control circuit 112 controls the motor 108 according to different parameters, but without applying an AC control signal or applying AC signals to different taps to provide for different operation of the motor 108. In various embodiments, by use of DC signals, the control circuit 112 provides cost savings and space savings over conventional controls, which incorporate mechanical relays or other bulky switches used in handling AC signals. Specifically, for example, embodiments described herein may permit such mechanical relays and/or bulky switches to be eliminated, by the control circuit originally providing a DC control signal to the motor 108, rather than providing an AC control signal to the motor 108. Additionally, or alternatively, in several embodiments, the control circuit 112 is useful with existing motor designs, such that redesigns or replacement of the motor and/or motor controller already in place is unnecessary.

The control circuit 112 controls the motor 108 in response to a demand, which may originate at the thermostat 114 or the indoor control board 110. The thermostat 114 or the indoor control board 110 may operate according to a predetermined routine, by which the HVAC system 100 is controlled through a day, week, month, or other predetermined time interval. The predetermined routine may include calls for heat or cooling at certain times of the day, or to certain set temperatures for certain intervals. The call may cause the HVAC system 100 to operate according to one or more modes, such as for example, multi-stage heating or cooling, fan only, or other modes, etc. The calls include a corresponding demand for the motor 108 to operate at a certain parameter, which in this embodiment, corresponds to a certain amount of air circulation.

For example, the blower motor 108 may operate at a lower speed to circulate less air in a heating mode and/or at a higher speed to circulate more air in a cooling mode. If there is a two stage system, there may be two different blower speeds for different modes (e.g., high heat W2, low heat W1, high cool Y2, low cool Y1). The control circuit 112 applies the appropriate DC control signal to the motor 108 to cause the motor 108 to operate according to the parameter corresponding to the demand.

Figure 2:
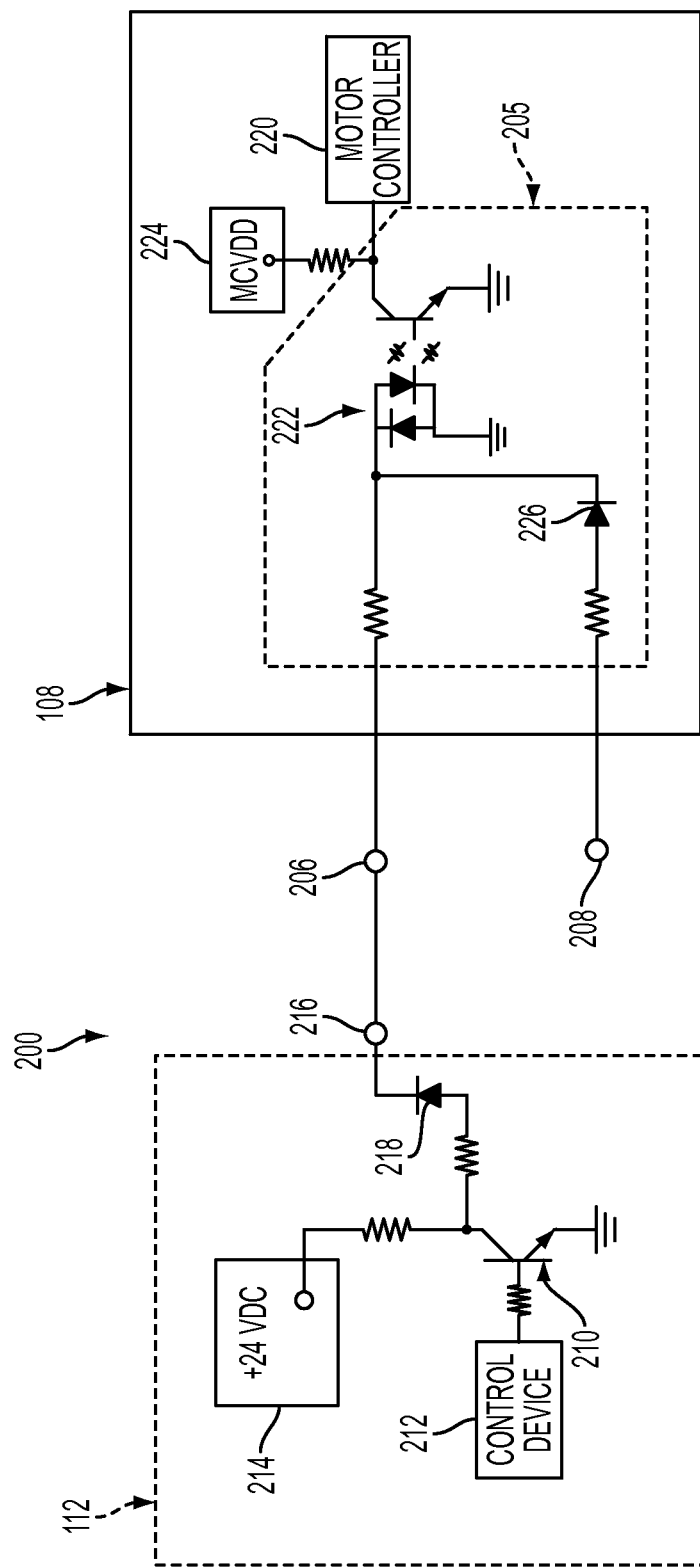
FIG. 2 is a schematic of an exemplary motor assembly that may be used in the HVAC system of FIG. 1.

FIG. 2 illustrates an exemplary embodiment of control circuit 112, which is incorporated in a motor control assembly 200. The motor control assembly 200 further includes the exemplary motor 108, which includes an input circuit 205 coupled to a motor controller 220. The input circuit 205 includes a first tap 206 and a second tap 208, which are coupled to the control circuit 112. The input circuit 205 further includes an opto-isolator 222, and a diode 226 coupled in series between the second tap 208 and the opto-isolator 222. A voltage source 224 is coupled to the opto-isolator 222. In this embodiment, the motor 108 includes two taps. In other embodiments, the motor 108 could have any suitable number of input taps, and the control circuit 112 could be designed to interface with the corresponding number of taps on the motor 108. Alternatively, another control circuit may be designed to interface with less than every tap of a motor of an HVAC system. In this particular embodiment, each tap corresponds to a different operating parameter of the motor 108 (e.g., speed, torque, etc.). For example, the motor 108 may operate at a first speed when the first tap 206 is activated and a second different speed when the second tap 208 is activated.

The input circuit 205 is configured such that if an alternating current (AC) signal is applied at the first tap 206 (AC signal example case not illustrated in FIG. 2), the input circuit 205 applies a first control signal to the motor controller 220, and if an AC signal is applied to the second tap 208 (not illustrated in FIG. 2), the input circuit 205 applies a second control signal to the motor controller 220. In response to the first control signal, the motor controller 220 operates the motor 108 according to a first parameter. Similarly, in response to the second control signal, the motor controller 220 operates the motor 108 according to the second parameter.

Figure 3:
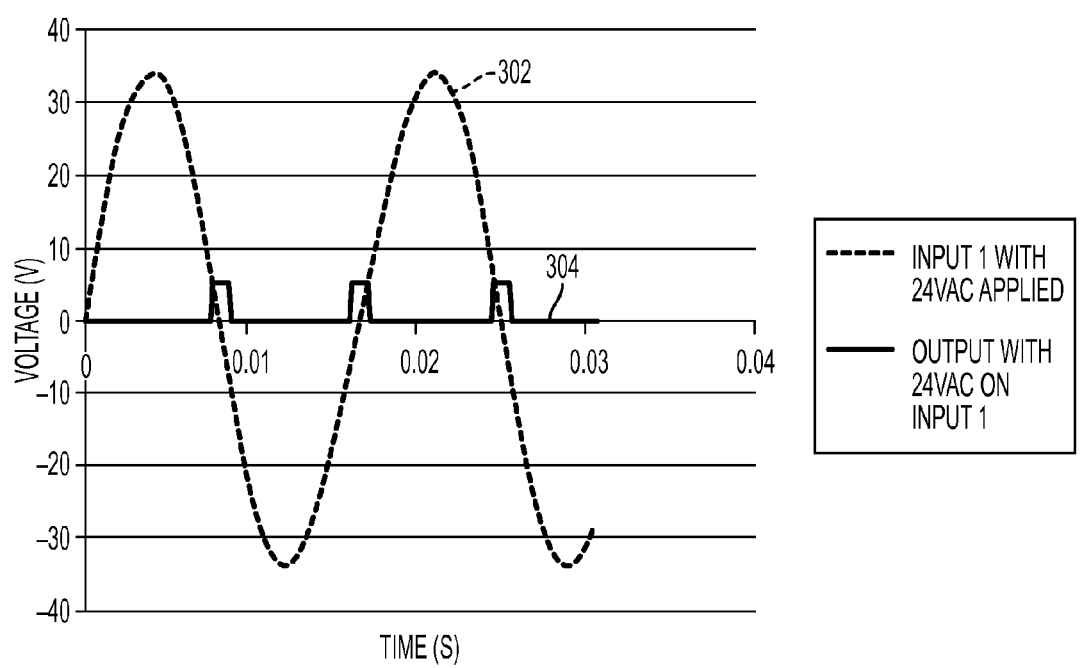
FIG. 3 is a plot of example input and output signals of the motor circuitry shown in FIG. 2 when the first motor input tap is energized.

Specifically, as illustrated in FIG. 3, if a 24 VAC signal 302 is applied to the first input tap 206, the opto-isolator 222 is turned ON when the AC signal 302 exceeds the turn of voltage of the opto-isolator 222. Because the 24 VAC signal 302 is not blocked by a diode, the full signal is applied to the opto-isolator 222. Consequently, a first output signal 304 is applied to the motor controller 220. The output signal 304 is low when the opto-isolator 222 is activated to pull the motor controller DC supply voltage 224 to ground. In this case, the output signal 304 is high only during the period that the 24 VAC signal 302 is below the turn-on voltage of the diodes 226 in the opto-isolator 222. This output signal 304 indicates to the motor controller 220 that the first tap 206 is energized, and in response, the motor controller 220 operates the motor 108 at the first parameter. Although AC signal 302 is illustrated having 24V rms, 33.9V peak, and a frequency of 60 Hz, it is understood that the AC signal 302 could have other parameter values. Output signal 304 is illustrated as a DC signal having a peak value of 5V, but it is understood that other parameter values could be used.

Figure 4:
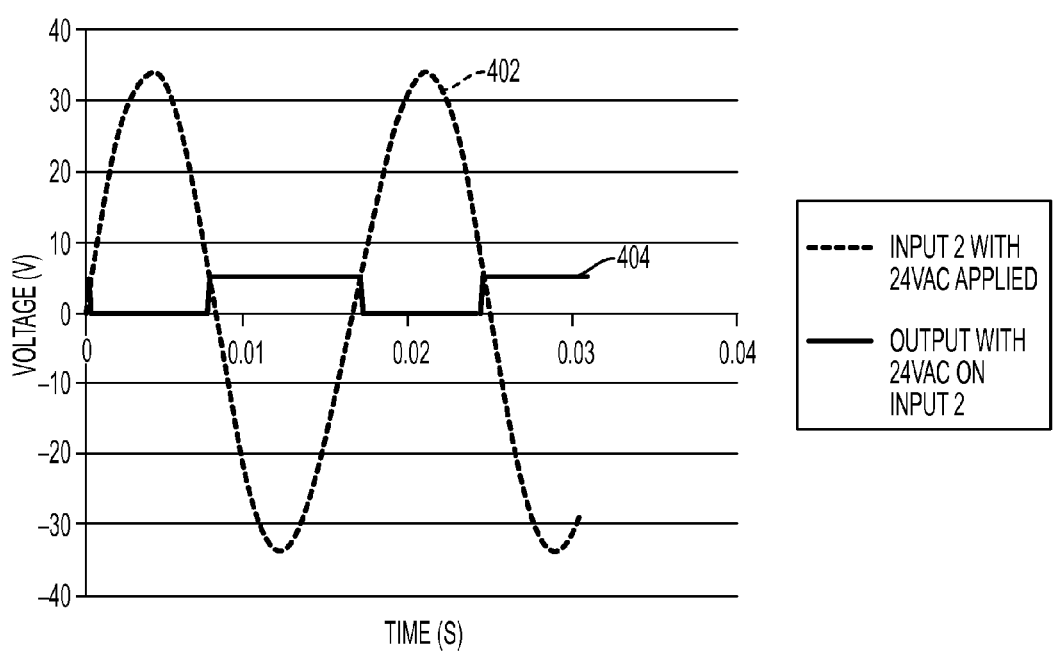
FIG. 4 is a plot of example input and output signals of the motor circuitry shown in FIG. 2 when the second motor input tap is energized.

Conversely, as illustrated in FIG. 4, if a 24 VAC signal 402 is applied to the second input tap 208 (not illustrated in FIG. 2), the diode 226 blocks the negative portions of the 24 VAC signal 402 from passing to the opto-isolator 222. The opto-isolator 222 is only activated during the positive half waves of the 24 VAC signal. Consequently, a second output signal 404 is applied to the motor controller 220. Therefore, the output signal 404 is only low when the 24 VAC signal 402 is positive and also exceeds the turn-on voltage of the opto-isolator 222. This output signal 404 is different that output signal 304 and indicates to the motor controller 220 that the second tap 208 is energized. The motor controller 220 in turn operates the motor 108 at the second parameter. Further, it should be appreciated that different input circuits may be employed in other embodiments, as long as different output signals are applied to the motor controller in response to an AC signal applied to either the first tap or the second tap. Although AC signal 402 is illustrated having 24V rms, 33.9V peak, and a frequency of 60 Hz, it is understood that the AC signal 402 could have other parameter values. Output signal 404 is illustrated as a DC signal having a peak value of 5V, but it is understood that other parameter values could be used.

Referring again to FIG. 2, the control circuit 112 includes a solid state switching device 210 coupled to the first tap 206 and a control device 212 coupled to the solid state switching device 210. The control circuit 112 also includes a supply voltage 214 coupled to the solid state switching device 210. The control circuit 112 includes an output 216, and a diode 218 connected in series between the switching device 210 and the output 216. The diode 218 can prevent current from flowing back into the control circuit 112 from the motor tap 206, but still permits DC voltage signals to be applied to the motor tap 206 at the control circuit output 216.

The control circuit 112 is configured to respond to the demand. The demand can be generated by the control circuit 112 according to a predetermined routine. Additionally, or alternatively, the control circuit 112 may include an input coupled to the control device 212 configured to receive a demand signal from a thermostat. The thermostat demand signal may be generated automatically based on a predetermined routine, or inputted directly by a user. Regardless of where it is generated, the demand corresponds to an operating parameter of the motor 108, and as a result, corresponds to which tap of the motor 108 should be energized. In some example embodiments, the demand may be part of a call provided by a thermostat or indoor control board, or may be generated based on the call. For example, the thermostat 114 may provide a call for low heat from the thermostat 114 to an indoor control board. The indoor control board 110 may then generate a demand for an operating parameter of the motor 108 (e.g., specific motor RPM speed) corresponding to one of the motor taps, which is associated with the call for low heat. In other embodiments, the thermostat 114 may generate the demand directly.

In response to the demand for the first parameter (whether from the thermostat 114 or the control circuit 112), the control device 212 switches the switching device 210 to apply either a first direct current (DC) control signal or a second DC control signal to the tap 206 of the motor 108. More specifically, to select the first parameter, the control circuit 112 applies a DC control signal to tap 206, which is substantially consistent with the output signal that the motor controller 220 would receive had the first input tap 206 been energized with a 24VAC signal (e.g., output signal 304). And, to select the second parameter, the control circuit 112 applies a different DC control signal to the tap 206 which is substantially consistent with the output signal that the motor controller 220 would receive had tap 208 been energized with a 24VAC signal (e.g., output signal 404).

In this manner, the control circuit 112 substantially emulates the output signals (that would otherwise be generated if AC signals were provided to taps 206 or 208) of the input circuit 205 at the input of the input circuit 205 with one or more DC control signals, thereby eliminating separate AC control signals to each of the separate taps. In particular, the first DC control signal defines a first signal pattern, which is substantially the same as the output 304 shown in FIG. 3. Conversely, the second DC control signal defines a second signal pattern, which is substantially the same as the output 404 shown in FIG. 4. This makes it possible for the control circuit 112 to select a first operating parameter or a second operating parameter for the motor 108 by interfacing with only one motor tap by a DC control signal.

Referring again to control circuit 112, any suitable solid state switching device 210 can be used. The solid state switching device 210 can be any suitable transistor (e.g., bipolar junction transistor (BJT), field effect transistor (FET), etc.). The switching device 210 is illustrated as a BJT in FIG. 2. The switching device 210 could also be a thyristor (e.g., a triac) or silicon-controlled rectifier in other embodiments. The supply voltage 214 could be set to any level capable of providing a control signal to a motor tap (e.g., a 24 volt DC supply, a five volt DC supply, etc.). In some embodiments the supply voltage 214 may be generated by the control circuit 112. Additionally, the control device 212 may include any device capable of providing a drive signal to switch the solid state switching device 210, such as, for example, a microprocessor, a microcontroller, a programmable gate array, a logic device, an ASIC, etc.

In FIG. 2, the output 216 is shown as separate from the tap 206 and is connected by a wire. In other embodiments, an output of a control circuit may be connected by other means suitable for transmitting a signal to a motor. In still other embodiments, at least a portion of a control circuit may be integrated with the motor 108.

Resistors are connected in series between components of the control circuit 112 to limit current in the control circuit 112 and protect components. For example, FIG. 2 illustrates a resistor connected between the supply voltage 214 and the collector of the switching device 210, between the control circuit 112 and the base of the transistor, and between the collector of the transistor and the diode 218. Other embodiments could use resistors between more, less, or different circuit components. Resistor values can be selected based on design techniques to limit current flow in the control circuit 112 and to protect components.

Figure 5:
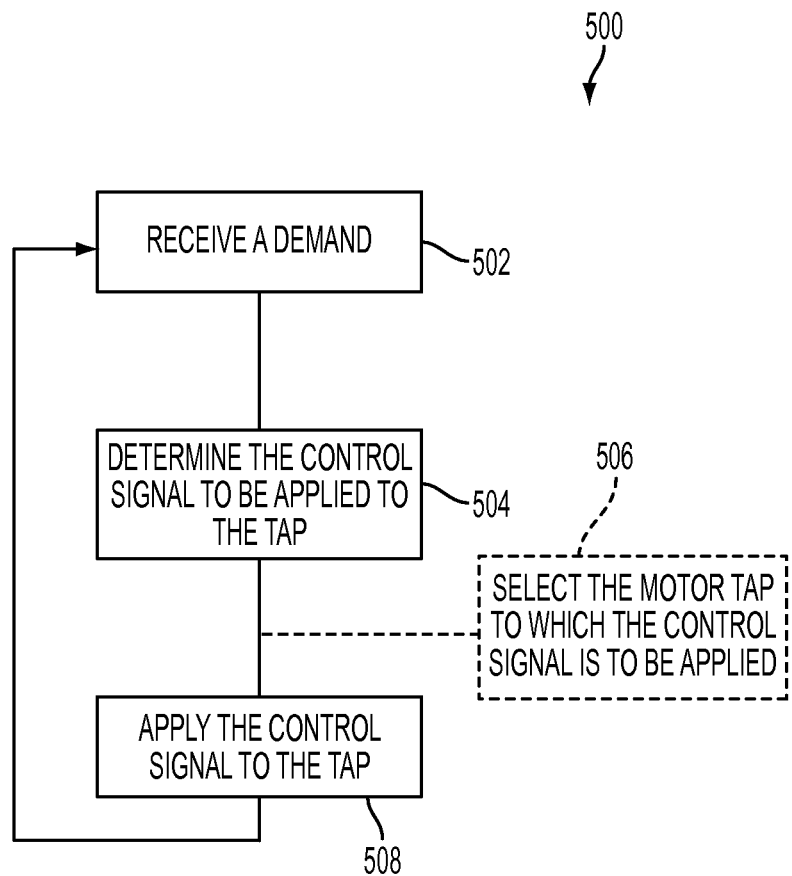
FIG. 5 is a block diagram of a method of controlling a motor according to an example embodiment of the present disclosure.

According to another example embodiment, a method 500 of controlling a motor is shown in FIG. 5. The method 500 is described with reference to the motor 108 and the control device 212, as described above with reference to FIGS. 1 and 2. It should be appreciated, however, that other different motors may be employed in combination with the methods described herein. The methods, however, are not limited to the control circuits and systems described herein, and may be used in other HVAC systems (including air handling systems without heating or cooling operations). Likewise, the circuits and assemblies described herein should not be understood to be limited to the exemplary methods described with reference to FIG. 5.

The method 500 includes receiving 502 a demand. The demand may be received from a thermostat or an indoor control board, for example. The demand may be generated by a thermostat or an indoor control board, and be based on a predetermined routine. For example, the demand may be a function of a preselected routine invoked by the thermostat, i.e. being in a heating or a cooling mode and operating the HVAC system according to temperature and/or humidity setpoints chosen by the occupant of the conditioned space. In some embodiments, the demand may be a function of the thermostat mode, i.e. a speed for the fan, a speed for heat (W1 or W2), or a speed for cool (Y1 or Y2). The predetermined routine may designate a particular temperature (or humidity or other condition) for certain time periods, such as, for example, 69° F. from 5:00 am to 7:30 am on Monday. In other embodiments, the demand may be generated based on direct user input, such as a setting selection by the user at the thermostat.

Based on the demand, the control device 212 determines 504 the control signal to be applied to the tap to cause the motor to operate according to the parameters indicated by the demand. In other embodiments, where the motor includes a different number of taps, the control device 212 may select 506 the tap of the motor to which the DC signal is to be applied. For example, as described with reference to FIG. 6, if the motor includes five taps, when the demand includes a request for operation at the second or third parameter, either of the second tap (Tap 2) or third tap (Tap 3) of the motor may be selected. Conversely, for example, when operation at the fourth or fifth parameter is requested, either of the fourth tap (Tap 4) or fifth tap (Tap 5) may be selected by the control circuit. Then, the control circuit determines the DC control signal to be applied to the selected motor tap.

Once the particular motor tap is selected 506 (if selected) and the control signal is determined 504, the control circuit applies 508 the control signal to the selected tap. If another demand is received, the method returns to 502 as illustrated in FIG. 5. Alternatively, if a demand signal is no longer provided, the method may not apply any DC control signals to any of the motor taps. In several embodiments, the control device 212 applies the control signal by switching a solid state switching device to operate the motor according to the demanded parameter.

Figure 6:
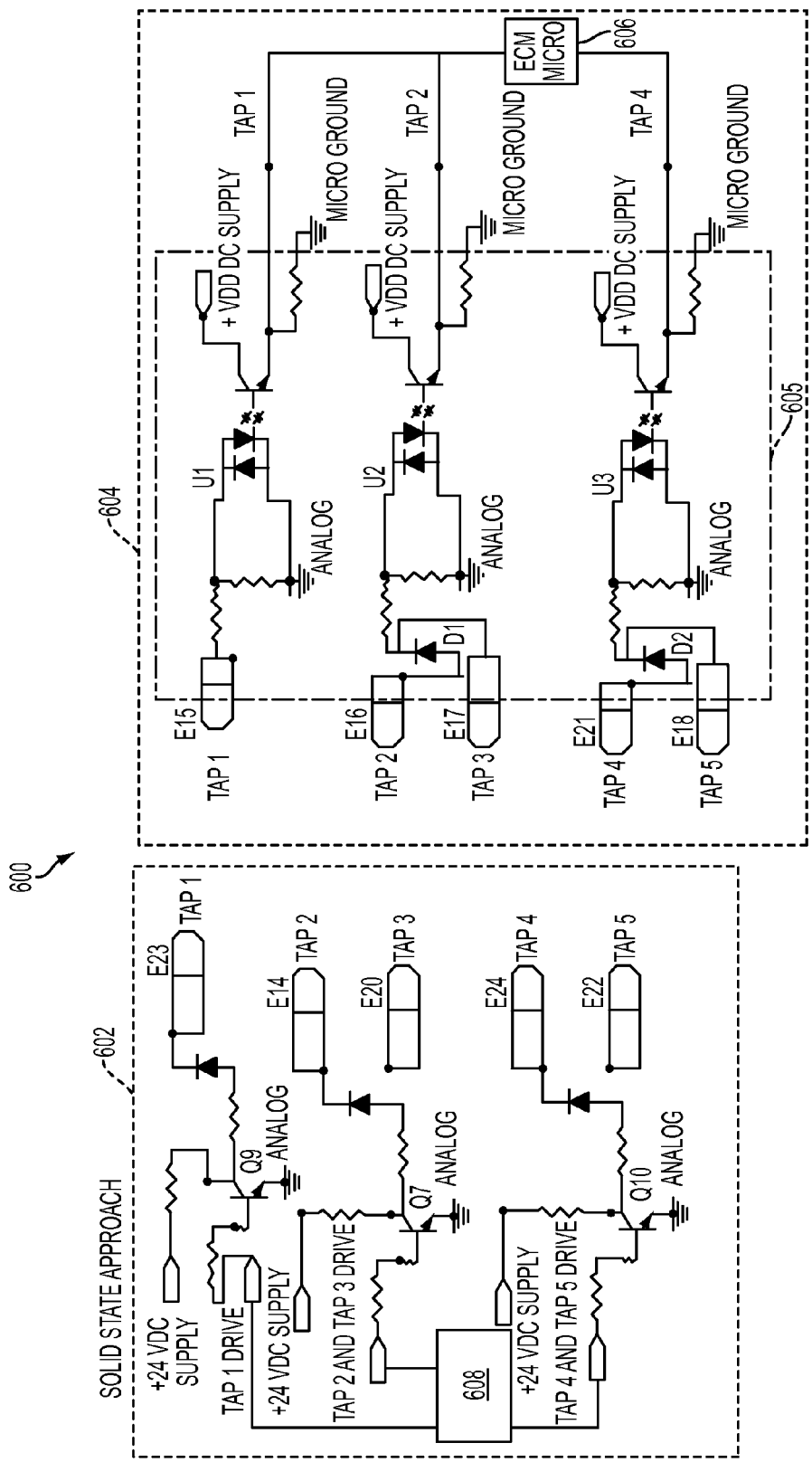
FIG. 6 is a schematic of an example motor control system according to another example embodiment of the present disclosure.

FIG. 6 illustrates a motor control system 600 including a control circuit 602 and a motor 604. The motor 604 includes multiple taps E15, E16, E17, E18 and E21, a motor controller 606, and an input circuit 605 having an opto-isolators U1, U2, and U3 and diodes D1 and D2. The opto-isolator U2 is coupled to the second tap E16 and the third tap E17, and the opto-isolator U3 is coupled to the fourth tap E21 and the fifth tap E18. The opto-isolator U1 is couple to the first tap E15. The diode D1 is coupled in series between the second tap E16 and the opto-isolator U2, and the motor controller 606 is coupled to the opto-isolators. The diode D2 is coupled similarly.

The input circuit 605 is configured to switch according to a first signal pattern to operate the motor 604 at a second parameter when an AC voltage energizes the second tap E16, and the input circuit 605 is configured to switch according to a second signal pattern to operate the motor 604 at a third different parameter when an AC voltage energizes the third tap E17. Likewise, the input circuit 605 is configured to switch according to a first signal pattern to operate the motor 604 at a fourth parameter when an AC voltage energizes the fourth tap E21, and the input circuit 605 is configured to switch according to a second signal pattern to operate the motor 604 at a fifth different parameter when an AC voltage energizes the fifth tap E18. In this particular embodiment, the first signal pattern, whether from opto-isolator U2 or U3, is substantially the same. And, the second signal pattern, whether from opto-isolator U2 or U3, is substantially the same. The patterns may be different in various other embodiments.

In this exemplary embodiment, the control circuit 602 includes a solid state switching device Q7 coupled to the first tap E16, a supply voltage (+24 VDC supply) coupled to the solid state switching device, and a control device 608 coupled to the solid state switching device.

When the control device 608 receives a demand requesting operation of the motor 604 at the speed associated with Tap 2 of the motor, the control device 608 switches transistor Q7 to apply a DC control signal to Tap 2 of the motor 604 substantially consistent with the signal pattern generated by the input circuit 605 when an AC voltage energizes Tap 2. Alternatively, this same DC control signal may be applied to Tap 3, without any change in function. The signal pattern will cause the motor 604 to operate at the speed associated with Tap 2. The signal pattern may be similar to the output signal pattern illustrated in FIG. 4. When the control device 608 receives a demand requesting operation of the motor 604 at the speed associated with Tap 3 of the motor 604, the control device 608 switches transistor Q7 to apply a DC control signal to Tap 3 of the motor 604 substantially consistent with the signal pattern generated by the input circuit 605 when an AC voltage energizes Tap 3. This signal pattern will cause the motor 604 to operate at the speed associated with Tap 3. The signal pattern may be similar to the output signal pattern illustrated in FIG. 3. The DC control signal may substantially match the phase, frequency and duty cycle of a 24 VAC signal in some embodiments.

The control circuit 602 performs substantially the same, when a demand requesting operation of the motor 604 at the speeds associated with Tap 4 and Tap 5. The control device 608 switches transistor Q10 to apply a DC control signal having a first signal pattern or a second signal pattern top to either Tap 4 or Tap 5.

In this manner, one transistor can be coupled to one motor tap, but still apply different control signal patterns through that tap to select other motor taps that the transistor is not actually connected to. Other unconnected taps can be selected by applying a control signal pattern that the motor 604 would expect to receive through an unconnected tap. Although unused taps do not need to be connected, they could be connected if helpful to eliminate confusion in the field for users working on the control system.

In other example embodiments, a control circuit may be configured to operate a motor of a HVAC system, the motor including at least a first tap and a second tap, the motor configured to operate at a first parameter when the first tap is energized with an AC signal and at a second different parameter when the second tap is energized with an AC signal. The control circuit may include a first solid state switching device, a second solid state switching device, and a control device coupled to the first solid state switching device and the second solid state switching device. The control device may be configured to switch the first solid state switching device to apply a DC signal to at least one of the first and second tap, in response to a demand for operation of the motor at the first parameter, to operate the motor at the first parameter. The control circuit may also be configured to switch the second solid state switching device to apply a DC signal to at least one of the first and second tap, in response to a demand for operation of the motor at the second parameter, to operate the motor at the second parameter. In this example case, a separate solid state switching device may be coupled to each tap of the motor.

As explained above, any suitable motor can be used in the system. Different embodiments may include different motors having a different number of taps, such as more or less than five taps.

In some example embodiments, the control circuit 602 can be located on an indoor control board of an HVAC system, and may decide which tap to energize based on a user setting from a thermostat. The control circuit 602 might interface with any number of taps on the motor 604. For example, some example embodiment control circuits 602 might interface with only three taps, while others may interface with five taps. In some example embodiments, the indoor control board is either an integrated furnace control or an air handler control, depending on the type of heat/cooling or whether there is heat/cooling. The control circuit 602 may be separate from the motor 604, which may make it possible to retrofit with existing motors.

In some example embodiments, the control circuit 602 may be used for heating, cooling, running the fan only, multistage heating or cooling, or other fan setting adjustments. Typically in an HVAC system there is only a need for a maximum of five speeds for the circulator. These speeds correspond to different cubic feet per minute (CFM) rates for the HVAC equipment. There might be two CFM's for heat, two CFM's for cool, and one CFM if just the fan is operating (i.e., there is no demand for heat or cool). The CFM's for cooling may be lower, in some embodiments, than the CFM's for heating. Two CFM's for heat may be used when there is a two stage heating system, such as a gas furnace having a lower BTU rate first stage, with a higher BTU rate second stage. There could also be a two stage cooling system, although one stage is more typical. In that example case, only one of the two CFM's (or speeds) would be used for operation in cooling. Further, in still other embodiments, the control circuit may be used in an HVAC system, in which there is no heat or cooling operations, and the different operating parameters merely provide different rates of air movement.

The exemplary motor assembly of FIG. 6 may be used in any suitable HVAC system, including the HVAC system 100 illustrated in FIG. 1. They may be used in an integrated furnace control, a unitary control, an air handler and any control that either communicates directly with a motor or has the motor control built into it.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control circuit for a motor of a HVAC system, the motor including at least a first tap and a second tap, the motor configured to operate at a first parameter when the first tap is energized and at a second different parameter when the second tap is energized, the control circuit comprising:

a solid state switching device for coupling to the first tap of the motor; and a control device coupled to the solid state switching device, the control device configured to switch the solid state switching device to apply a first control signal to the first tap, in response to a demand for operation of the motor at the second parameter, to operate the motor at the second parameter, the control device configured to switch the solid state switching device to apply a second control signal to the first tap, in response to a demand for operation of the motor at the first parameter, to operate the motor at the first parameter;

wherein the solid state switching device is a bipolar junction transistor having a base, an emitter and a collector, wherein the base is coupled to the control device, and wherein the collector is coupled to a power supply; and wherein the control circuit further comprises:
an output for coupling to the first tap of the motor, wherein the collector of the transistor is coupled to the output; and
a diode coupled in series between the collector of the transistor and the output, the diode configured to substantially prevent current flow from the output to the collector.

2. The control circuit of claim 1, wherein the control device is configured to generate the demand for operation at the second parameter based on a predetermined routine.

3. The control circuit of claim 1, wherein the first control signal is a first direct current (DC) control signal, and wherein the second control signal is a second DC control signal.

4. The control circuit of claim 3, wherein the control circuit is operable to select the first operating parameter or the second operating parameter for the motor by interfacing with only the first tap by applying the corresponding first or second DC control signal to the first tap.

5. The control circuit of claim 1, wherein the control device is configured to receive the demand for operation at the second parameter from a thermostat.

6. A method of controlling a motor including at least a first tap and a second tap, the motor configured to operate at a first parameter when the first tap is energized and at a second different parameter when the second tap is energized, the method comprising:
applying, by a solid state switching device, a first control signal to the first tap to operate the motor according to the first parameter, when a demand indicates operation of the motor at the first parameter; and
applying, by the solid state switching device, a second control signal to the first tap to operate the motor according to the second parameter, when the demand indicates operation of the motor at the second parameter;
wherein the first control signal is a direct current (DC) control signal, and wherein the second control signal is a DC control signal;
wherein the motor further includes a third tap and a fourth tap, the motor configured to operate at a third parameter when the third tap is energized and a fourth parameter when the fourth tap is energized, and the solid state switching device is a first solid state switching device; and
wherein the method further comprises:
applying, by a second solid state switching device, the first control signal to the third tap to operate the motor according to the third parameter, when the demand indicates operation of the motor at the third parameter; and
applying, by the second solid state switching device, the second control signal to the fourth tap to operate the motor according to the fourth parameter, when the demand indicates operation of the motor at the fourth parameter.

7. The method of claim 6, further comprising receiving the demand from a thermostat.

8. The method of claim 6, wherein the first operating parameter or the second operating parameter is selectable for the motor by interfacing with only the first tap by applying the corresponding first or second control signal to the first tap.

9. The method of claim 6, further comprising generating, at an indoor control board, the demand based on a predetermine routine.

10. The method of claim 6, further comprising generating, at a thermostat, the demand based on a predetermine air handling routine.

11. A motor control assembly comprising:
a motor including:
a motor controller,
a first input circuit coupled to the motor controller, the first input circuit including a first tap, a second tap, a first opto-isolator, and a first diode, the first opto-isolator coupled to the motor controller, the first tap, and the second tap, the first diode coupled in series between the first tap and the first opto-isolator, the first input circuit configured to apply a first control signal to the motor controller in response to an AC signal at the first tap to operate the motor at a first parameter, and
wherein the first input circuit is configured to apply a second control signal to the motor controller, in response to an AC signal at the second tap to operate the motor at a second parameter; the first control signal defining a first signal pattern, the second control signal defining a second signal pattern; and
a control circuit coupled to the motor and configured to apply a first direct current (DC) control signal to the first tap, the first DC control signal substantially consistent with the first signal pattern, when a demand indicates a request for operation of the motor according to the first parameter, and the first DC control signal substantially consistent with the second signal pattern, when the demand indicates a request for operation of the motor according to the second parameter.

12. The motor control assembly of claim 11, wherein the control circuit includes a first solid state switching device coupled to the first tap, a supply voltage coupled to the first solid state switching device, and a control device coupled to the first solid state switching device, wherein the control device is configured to switch the first solid state switching device to apply the first DC control signal to the first tap.

13. The motor control assembly of claim 12, wherein the control circuit includes a diode coupled between the first solid state switching device and the first tap.

14. The motor control assembly of claim 12, wherein the motor includes a second input circuit coupled to the motor controller,
wherein the second input circuit includes a third tap, a fourth tap, a second opto-isolator, and a second diode, the second opto-isolator coupled to the motor controller, the third tap, and the fourth tap, the second diode coupled in series between the fourth tap and the second optoisolator,
wherein the second input circuit is configured to apply a third control signal to the motor controller in response to an AC signal at the third tap to operate the motor at a third parameter;
and the second input circuit is configured to apply a fourth control signal to the motor controller, in response to an AC signal at the fourth tap to operate the motor at a second parameter; the third control signal defining a third signal pattern, the fourth control signal defining a fourth signal pattern; and
wherein the control circuit includes a second solid state switching device coupled to the third tap, the supply voltage coupled to the second solid state switching device, the control device coupled to the second solid state switching device;

wherein the control device is configured to apply, by the second solid state switching device, a second DC control signal to the third tap, the second DC control signal substantially consistent with the third signal pattern, when a demand indicates a request for operation of the motor according to the third parameter, and the second DC control signal substantially consistent with the fourth signal pattern, when the demand indicates a request for operation of the motor according to the fourth parameter.

15. The motor control assembly of claim 14, wherein the first signal pattern is substantially the same as the third signal pattern.

16. The motor control assembly of claim 11, wherein the motor is an electronically commutated motor.

17. An HVAC system comprising the motor control assembly of claim 11.

18. The HVAC system of claim 17, further comprising an indoor control board, wherein the indoor control board includes said control circuit.

19. The HVAC system of claim 18, further comprising a thermostat coupled to the indoor control board, and wherein the thermostat is configured to send the demand in response to a predetermine routine.

* * * * *